US009328618B2

(12) United States Patent
Grohens et al.

(10) Patent No.: US 9,328,618 B2
(45) Date of Patent: May 3, 2016

(54) HIGH-PRESSURE TURBINE NOZZLE FOR A TURBOJET

(75) Inventors: Régis Grohens, Tournan en Brie (FR); Renaud Gabriel Constant Royan, Sucy en Brie (FR)

(73) Assignee: SNECMA, Paris (FR)

( * ) Notice: Subject to any disclaimer, the term of this patent is extended or adjusted under 35 U.S.C. 154(b) by 961 days.

(21) Appl. No.: 13/522,163

(22) PCT Filed: Jan. 6, 2011

(86) PCT No.: PCT/FR2011/050017
§ 371 (c)(1),
(2), (4) Date: Nov. 9, 2012

(87) PCT Pub. No.: WO2011/086305
PCT Pub. Date: Jul. 21, 2011

(65) Prior Publication Data
US 2013/0051980 A1 Feb. 28, 2013

(30) Foreign Application Priority Data

Jan. 14, 2010 (FR) ...................................... 10 50229

(51) Int. Cl.
*F01D 5/18* (2006.01)
*F01D 9/04* (2006.01)
*F01D 17/08* (2006.01)

(52) U.S. Cl.
CPC .......... *F01D 5/189* (2013.01); *F01D 9/04* (2013.01); *F01D 17/085* (2013.01); *F05D 2220/3212* (2013.01); *F05D 2240/126* (2013.01); *F05D 2270/08* (2013.01); *F05D 2300/21* (2013.01); *F05D 2300/50212* (2013.01);
(Continued)

(58) Field of Classification Search
CPC ......... F01D 5/189; F01D 9/04; F01D 17/085; F05D 2300/603; F05D 2300/50212; F05D 2300/21; F05D 2240/126; F05D 2220/3212; F05D 2270/08; Y02T 50/677; Y02T 50/672; Y02T 50/676
USPC ......................................... 415/115; 416/97 R
See application file for complete search history.

(56) References Cited

U.S. PATENT DOCUMENTS

| 4,805,398 A | 2/1989 | Jourdain et al. |
| 2003/0031555 A1 | 2/2003 | Noe et al. |
| 2007/0231150 A1 | 10/2007 | Dervaux et al. |

(Continued)

FOREIGN PATENT DOCUMENTS

| EP | 0 266 235 | 5/1988 |
| EP | 1 284 338 | 2/2003 |

(Continued)

OTHER PUBLICATIONS

International Search Report Issued May 11, 2011 in PCT/FR11/050017 Filed Jan. 6, 2011.

*Primary Examiner* — Igor Kershteyn
*Assistant Examiner* — Aaron R Eastman
(74) *Attorney, Agent, or Firm* — Oblon, McClelland, Maier & Neustadt, L.L.P.

(57) ABSTRACT

A high temperature turbine nozzle with automatic regulation of flow of cooling air passing therethrough. Each of vanes includes a first sleeve drilled with holes and a second sleeve that is engaged in the first sleeve, drilled with corresponding holes, and made of a material possessing a coefficient of expansion different from that of the first sleeve.

7 Claims, 2 Drawing Sheets

(52) U.S. Cl.
CPC ........ *F05D 2300/603* (2013.01); *Y02T 50/672* (2013.01); *Y02T 50/676* (2013.01); *Y02T 50/677* (2013.01)

(56) References Cited

U.S. PATENT DOCUMENTS

2009/0001061 A1* 1/2009 Beck .................... B23K 26/383 219/121.71
2009/0196737 A1 8/2009 Mitchell
2010/0089468 A1 4/2010 Scott et al.

FOREIGN PATENT DOCUMENTS

| EP | 1 840 331 | 10/2007 |
| EP | 1 936 468 | 6/2008 |
| GB | 2 457 073 | 8/2009 |

* cited by examiner

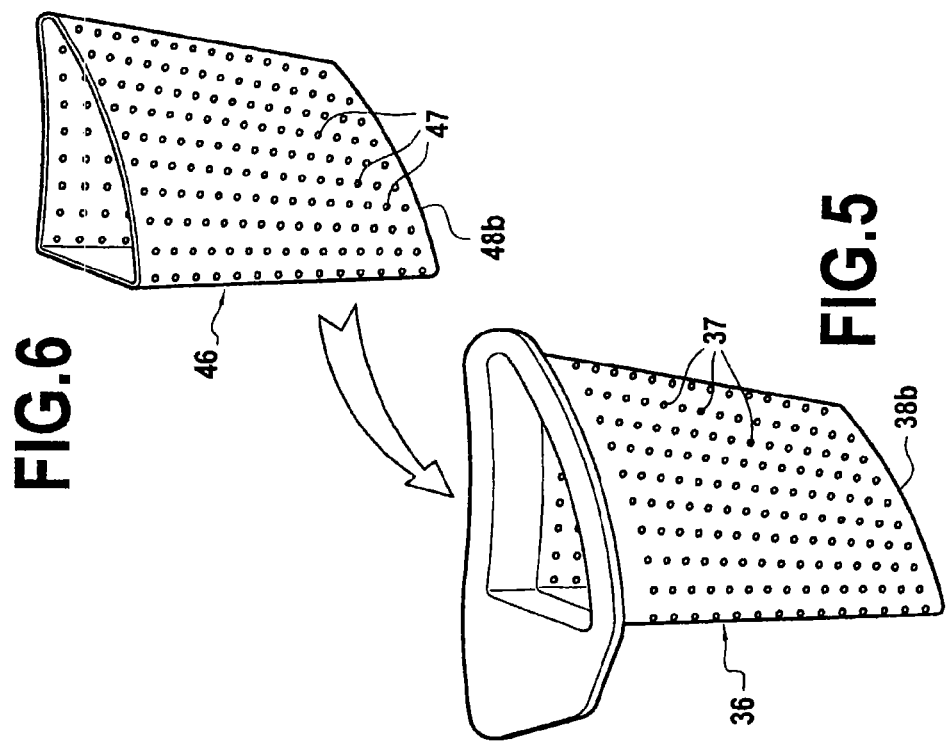
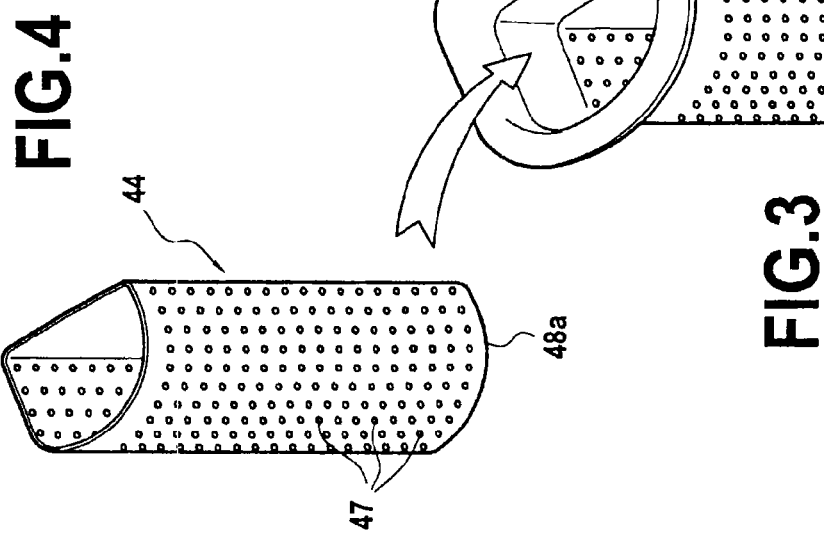

HIGH-PRESSURE TURBINE NOZZLE FOR A TURBOJET

The invention relates to a high-pressure turbine nozzle for a turbojet; it relates more particularly to an improvement serving to limit the emission of harmful and/or polluting gases, in particular while taxiing on the ground, on airports where such discharges give rise to the problems that are the greatest in environmental terms.

In an airplane turbojet, the high-pressure nozzle is a set of stationary vanes arranged annularly in a gas flow passage between the outlet from the combustion chamber and the inlet to the high-pressure turbine. This subassembly is the subassembly that is subjected to the highest gas temperatures, which temperatures exceed the melting temperatures of the (metal) materials used. This applies typically during so-called "hot" stages of operation of the engine, typically during take-off, while climbing, and while flying under cruising conditions. It is therefore necessary for this subassembly to be cooled continuously, and in particular for its vanes to be cooled. In known manner, the vanes extend radially between two segmented annular platforms that define the flow passage for the gas exhausted from the combustion chamber. The vanes are hollow. Each vane includes at least one cavity, and very generally two adjacent cavities, each cavity having at least one end opening out to the outside of the passage, through an above-mentioned platform. The vanes include holes extending between the or each cavity and the passage. For example, a distinction is drawn between a leading edge cavity (beside the combustion chamber) opening out radially towards the inside, and a trailing edge cavity (beside the high-pressure turbine) opening out radially towards the outside.

A sleeve is engaged in the or each cavity in such a vane. The sleeve has a plurality of holes over its entire surface extending between the annular platforms. The sleeve includes a closed end wall at one end and it opens out to the outside of the passage on the same side as the cavity that contains it.

Relatively cool air is taken from upstream of the combustion chamber at the outlet of a compressor stage. This air is injected into the sleeves through the platforms. The cool air penetrates into the inside of the sleeve in order to cool the vane from the inside by impact. Thereafter, by escaping into the passage through the holes in the vane, the cooling air creates a protective film of relatively cool air running along the outside surface of the vane.

The flow section defined by the holes is designed to define ventilation suitable for appropriately cooling the vane while the engine is operating in a "hot" stage of operation, as defined above.

The drawback of such a system is that the cool air taken from the compressor, by bypassing the combustion chamber, does not contribute to combustion, and thereby contributes to increasing pollution (in particular with the compounds CO, CH, and NOx). The invention stems from the following analysis:

In other operating conditions, the turbojet operates with lower combustion gas temperatures in the combustion chamber. This applies in particular while taxiing on the ground, when idling, i.e. for the most part operations that take place on an airport, more particularly where it is most advantageous to reduce pollution.

The invention proposes a system of automatically regulating the flow rate of cooling air passing through the nozzle, so as to be well adapted to the temperatures encountered in various operating conditions. The basic idea consists in reducing the flow rate of cooling air during so-called "cold" stages of operation of the engine, in particular for the purpose of reducing emissions of pollutants, while also reducing the quantities of air that are taken from the compressor.

In this spirit, the invention provides a nozzle for a high-pressure turbine of a turbojet, the nozzle comprising a ring of stationary and hollow vanes arranged between two coaxial annular platforms defining a gas flow passage and in which each vane includes at least one cavity housing a first sleeve having one end opening out to the outside of said passage through an above-mentioned platform and having an end wall at its other end, said first sleeve being drilled by a plurality of holes opening out into said cavity, the nozzle being characterized in that a second sleeve of material possessing a coefficient of expansion different from that of the first sleeve is engaged inside each first sleeve and is shaped so that its outside wall is substantially in contact with the inside wall of said first sleeve, and in that said second sleeve is drilled by a plurality of holes substantially in correspondence with the holes of said first sleeve, one end of said second sleeve being fastened to said end wall of said first sleeve.

It can be understood that the difference in expansion between the two sleeves serves to vary the overall flow section for cooling air penetrating into the cavities of the vanes. The advantage of this cooling system is that it does not require any control, with the flow rate of cooling air being varied automatically and progressively as a function of temperature variations.

More particularly, the holes formed in each first sleeve, and the holes formed in the corresponding second sleeve, are in maximum correspondence at a nominal operating temperature corresponding to a hot stage of operation of the turbojet.

Typically, each vane has a leading edge cavity first sleeve opening out to the outside of the passage through one platform and a trailing edge cavity first sleeve opening out to the outside of the passage through the other platform. Each first sleeve of a leading edge or trailing edge cavity houses an above-mentioned second sleeve of corresponding shape and dimensions.

Typically, said first sleeves are made of metal while said second sleeves are made of composite material having a low coefficient of expansion. This coefficient of expansion is considerably smaller than that of the metal used for constituting said first sleeves.

Advantageously, said second sleeves are made of ceramic.

Preferably, each first sleeve and the second sleeve that it contains are paired.

In a method of forming holes in said first and second sleeves, the holes may be drilled simultaneously while hot. More particularly, the paired sleeves may be drilled together in an enclosure raised to an above-mentioned nominal temperature corresponding to a stage of hot operation of the turbojet.

The invention can be better understood and other advantages thereof appear more clearly in the light of the following description of a high-pressure turbine nozzle in accordance with its principle, given purely by way of example and made with reference to the accompanying drawings, in which:

FIG. 3 shows a metal sleeve for a leading edge cavity;

FIG. 4 shows a corresponding composite material sleeve;

FIG. 5 is a perspective view of a metal sleeve for a trailing edge cavity; and

FIG. 6 is a perspective view of the corresponding composite material cavity.

Figure 1:
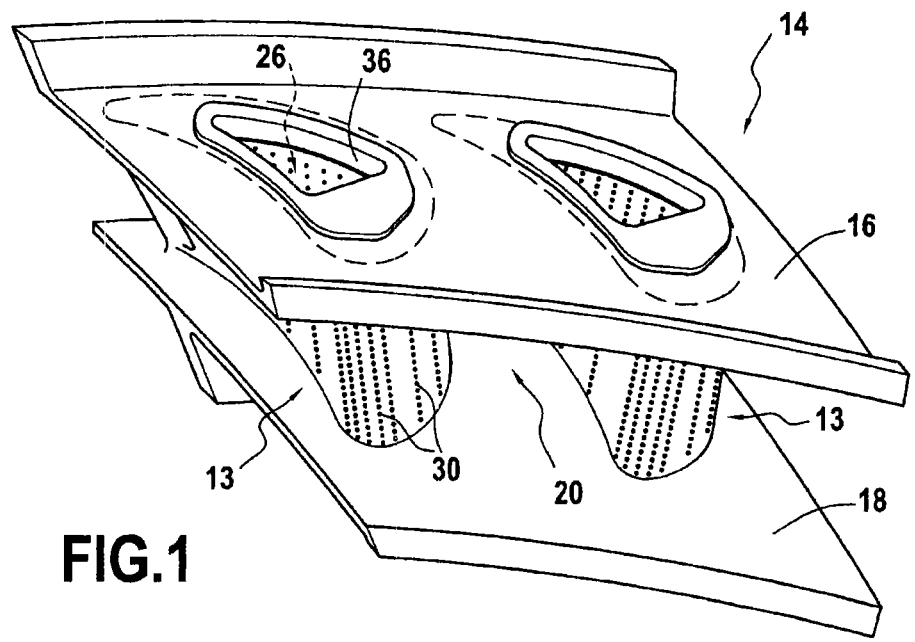
FIG. 1 is a fragmentary outside perspective view of the nozzle in accordance with the invention.
Figure 2:
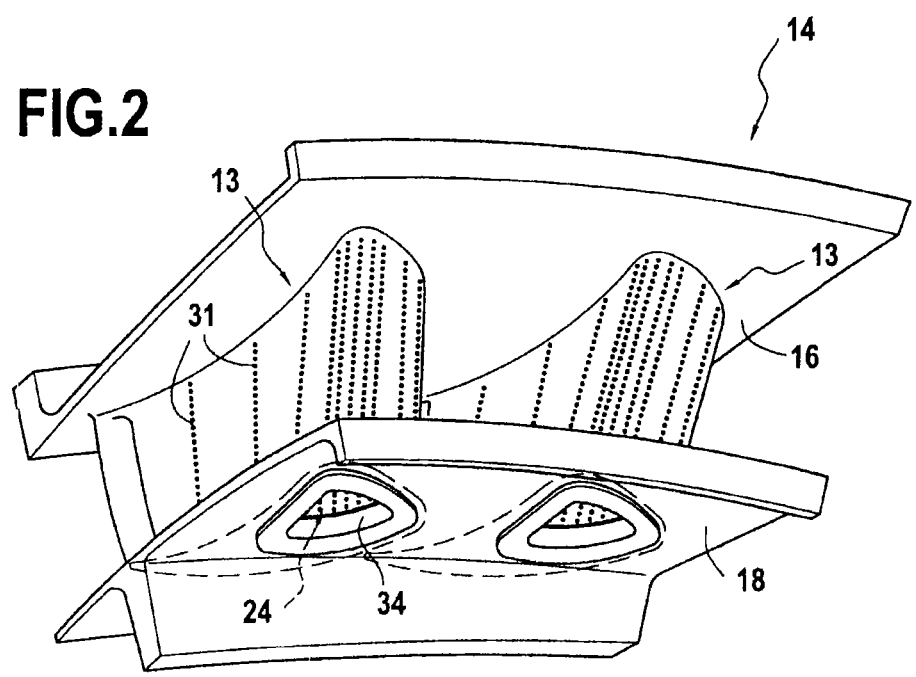
FIG. 2 is a fragmentary inside perspective view of the same nozzle.

A nozzle of a high-pressure turbine of a turbojet is made up of a ring of stationary vanes 13 made by assembling together side by side a plurality of segments 14 as shown in FIGS. 1 and 2.

The vanes are hollow and arranged between two coaxial annular platforms 16 and 18 that are formed by assembling the segments 14 together side by side. The annular platforms thus define a gas flow passage 20 in which the vanes 13 are to be found in a regular angular distribution between the platforms 16 and 18. Each hollow vane in this example has a leading edge cavity 24 opening out to the outside of the passage through the inner platform 18, and a trailing edge cavity 26 opening out to the outside of the passage through the outer platform 16. In other words, each hollow vane is subdivided into two adjacent cavities, one of which, 24, is situated beside the leading edge, and the other of which, 26, is situated beside the trailing edge. These cavities communicate with the passage via radially-extending rows of holes 30, 31. By way of example, it can be understood that rows of holes 30 extend between the leading edge cavity and the passage, while rows of holes 31 extend between the trailing edge cavity and the passage. This arrangement is known and does not need to be described in greater detail. Furthermore, it is also known to engage a respective metal sleeve 34, 36 in each cavity 24, 26 of the vane, such a sleeve being referred to as a "first" sleeve and being drilled by a plurality of holes 37. Thus, FIG. 3 shows the metal sleeve 34 engaged in the leading edge cavity 24 of the vane, while FIG. 5 shows the metal sleeve 36 engaged in the trailing edge cavity 26 of the same vane.

As shown, the first sleeve 34 of the leading edge cavity opens out to the outside of the passage through a platform, here the inner platform 18, while the first sleeve 36 of the trailing edge cavity opens out to the outside of the passage through the other platform, here the outer platform 16. It is recalled that the relatively cool air is taken from the compressor and passes on over both sides of the nozzle, i.e. both outside the outer platform 16 and inside the inner platform 18. The cooling air can thus penetrate into the sleeves in order to cool the inside walls of the vanes by the impact effect and then flow into the passage through holes in said vanes 13 in order to create a cooling film around each of them.

According to an important characteristic of the invention, a second sleeve 44, 46 of material having a coefficient of expansion different from that of said first sleeve 34, 36 is engaged inside each of said first sleeves and is shaped so that its outside wall is substantially in contact with the inside wall of said corresponding first sleeve. This second sleeve 44, 46 is drilled with a plurality of holes 47 substantially in correspondence with the holes of said first sleeve. Furthermore, one end 48a, 48b of the second sleeve is fastened to a closed end wall 38a, 38b of said respective first sleeve, i.e. a wall remote from the opening through which cool air enters.

The holes formed in each first sleeve and those formed in the corresponding second sleeve are in maximum correspondence (i.e. providing a maximum flow section) at a nominal operating temperature corresponding to hot stages of operation of the turbojet.

Typically, when said first sleeves are made of metal, the second sleeves are made of composite material having a small coefficient of expansion, and in particular a coefficient that is much smaller than that of the metal from which said first sleeves are made. For example, said second sleeves are made of ceramic.

While operating "cold", the second sleeve 44, 46 of composite material is slightly "longer" radially than the metal sleeve that contains it. Consequently, the holes are in partial correspondence only, in pairs, and the flow section is small. As a result, for all idling speeds of operation, in particular on airports, the quantity of air that is taken is relatively small, which is acceptable, given that during such a stage of operation, the nozzle hardly requires any cooling. In contrast, on takeoff, while climbing, or even while cruising, the high temperature of the combustion gas causes the metal sleeves 34, 36 to expand, i.e. to become longer in the radial direction. This results in a larger flow section for cooling air. The greater flow rate of cooling air thus enables the nozzle to be cooled effectively.

In practice, it is desirable for each first sleeve 34, 36 and for the second sleeve 44, 46 that it contains to be paired. Advantageously, the two paired sleeves may be drilled together at a temperature corresponding to the temperature encountered during a "hot" stage. For example, the two paired sleeves may be engaged one in the other and then drilled together in an enclosure raised to a high nominal temperature as defined above.

For operation to be effective, it is necessary for the sealing between the two sleeves 34, 44-36, 44 to be as good as possible during all stages of operation of the engine. The second sleeve of composite material is engaged while cold in the first sleeve made of metal and the dimensions of these two parts are defined in such a manner that one is inserted inside the other with clearance that is extremely small or zero. Consequently, sealing is guaranteed during cold stages of operation of the engine. During hot stages of operation, the relative expansion of the metal sleeve compared with the composite material sleeve, in the width direction, is of the order of four hundredths of a millimeter, which is very small and may be considered as having no influence on the sealing between the sleeves.

The invention claimed is:

1. A nozzle for a high-pressure turbine of a turbojet, the nozzle comprising:
a ring of stationary and hollow vanes arranged between first and second coaxial annular platforms defining a gas flow passage and in which each vane includes at least one cavity housing a first sleeve including a first end opening out to an outside of the passage through one of the platforms and including an end wall at a second end, the first sleeve being drilled by a plurality of holes opening out into the cavity,
wherein a second sleeve of material possessing a coefficient of expansion different from that of the first sleeve is engaged inside the first sleeve and is shaped so that an outside wall of the second sleeve is substantially in contact with an inside wall of the first sleeve,
wherein the second sleeve is drilled by a plurality of holes substantially in correspondence with the holes of the first sleeve, one end of the second sleeve being fastened to the end wall of the first sleeve, and
wherein the holes of the second sleeve are in partial alignment with the holes of the first sleeve at a first temperature, and the holes of the second sleeve are in maximum alignment with the holes of the first sleeve at a second temperature higher than the first temperature.

2. A nozzle according to claim 1, wherein the holes formed in each first sleeve, and the holes formed in the corresponding second sleeve, are in maximum correspondence at a nominal operating temperature corresponding to hot stages of operation of the turbojet.

3. A nozzle according to claim 2, wherein each vane includes a leading edge cavity first sleeve opening out to an outside of the passage through one platform and a trailing edge cavity first sleeve opening out to the outside of the passage through the other platform, and each leading edge and the trailing edge first cavity houses a corresponding second sleeve.

4. A nozzle according to claim 1, wherein each vane includes a leading edge cavity first sleeve opening out to an outside of the passage through one platform and a trailing edge cavity first sleeve opening out to the outside of the passage through the other platform, and each leading edge and the trailing edge first cavity houses a corresponding second sleeve.

5. A nozzle according to claim 1, wherein the first sleeves are made of metal and the second sleeves are made of composite material having a relatively lower coefficient of expansion.

6. A nozzle according to claim 5, wherein the second sleeves are made of ceramic.

7. A nozzle according to claim 1, wherein each first sleeve and the second sleeve that it contains are paired.

\* \* \* \* \*